United States Patent

[11] 3,611,345

| [72] | Inventor | Robert H. Pintell<br>Congers, N.Y. |
|---|---|---|
| [21] | Appl. No. | 816,660 |
| [22] | Filed | Apr. 16, 1969 |
| [45] | Patented | Oct. 5, 1971 |
| [73] | Assignee | Intron International Inc.<br>Congers, N.Y. |

[54] MOTION DETECTOR
5 Claims, 8 Drawing Figs.

[52] U.S. Cl. ............................................. 340/280,
200/61.46, 324/41, 340/258 C
[51] Int. Cl. ........................................... G08b 13/14,
G08b 13/24
[50] Field of Search .......................................... 340/258 C,
280, 282, 276, 261, 195, 196; 324/41, 47;
200/61.46

[56] References Cited
UNITED STATES PATENTS

| 2,390,328 | 12/1945 | Roberts | 340/199 |
| 3,036,266 | 5/1962 | Hulls | 340/282 |
| 3,140,606 | 7/1964 | Kramer et al. | 340/196 |
| 3,154,946 | 11/1964 | Ordorica et al. | 340/196 |
| 3,281,670 | 10/1966 | Myers et al. | 324/47 |
| 3,287,720 | 11/1966 | Chambers et al. | 340/282 |
| 3,324,848 | 6/1967 | Domeier et al. | 340/279 |

OTHER REFERENCES

Luck et al., " The Prison Gun Detector" ; Radio World, December 1936; pp. 50–56.

*Primary Examiner*—John W. Caldwell
*Assistant Examiner*—J. Michael Bobbitt
*Attorney*—Karl F. Ross

ABSTRACT: A mobile body is confined within a spherical or spheroidal chamber which forms part of an electric monitoring circuit, displacement of the body from an initial position resulting in changes of circuit impedance (through variations in conductance, capacitance or inductance) which are registered on an indicator.

Robert H. Pintell
INVENTOR.

BY
Karl F. Ross
Attorney

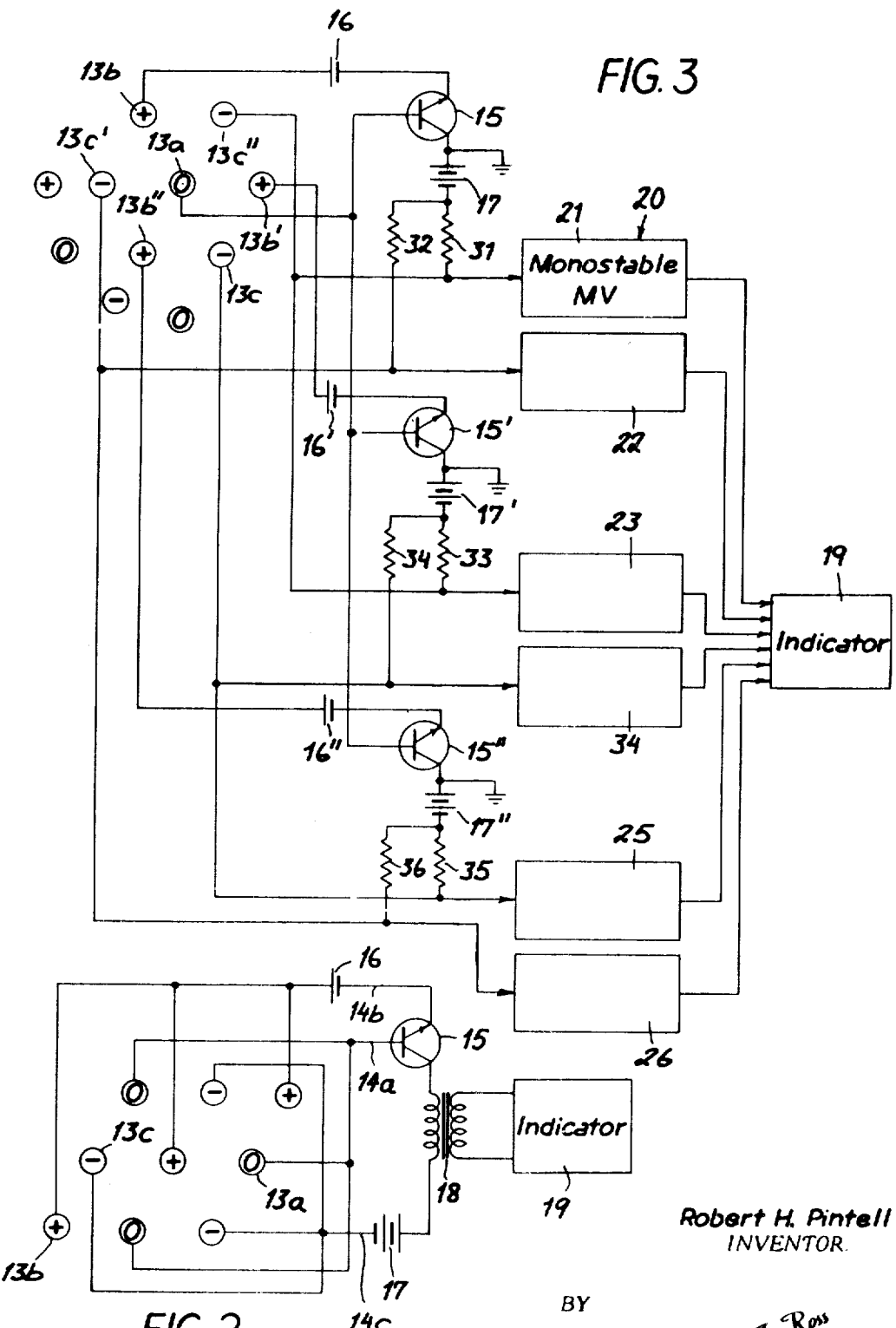

3,611,345

1

MOTION DETECTOR

My present invention relates to a motion detector or sensor to ascertain an abnormal displacement, however minute, of a device normally at rest or rotating about a fixed axis. A system of this description is useful, for example, to check whether certain articles were disturbed by unauthorized persons in the absence of the legitimate owner, to monitor earth tremors, or to signal the untimely opening of a door or window. Thus, the device may be incorporated in a paperweight placed on a stack of letters or concealed in a drawer of a desk or a file cabinet.

The general object of my invention is to provide a highly sensitive and reliable motion detector of this character which, on being displaced in any way or in a specific direction, trips an alarm or other indicator means to register the occurrence of such displacement. In some instances, e.g. when the device is mounted on the wheel of a vehicle to indicate whether the same has been moved, the possible displacement can occur only in one plane so that a relatively simple motion detector may be used. In the more general case, however, the article to be monitored may be movable in any direction so that a more sophisticated sensing system will be required. In some of these latter instances it will also be desirable to ascertain the sense of motion, e.g. for the purpose of determining whether a closed box intended to rest in a particular position has been turned to either side or has been stood on one of its ends.

It is, accordingly, a more particular object of my invention to provide sensing means of the aforedescribed type responding selectively to a predetermined sense of displacement or to discriminate between different directions of motion.

A motion detector according to my invention comprises, basically, a confining chamber surrounding a mobile body which is capable, on being displaced within that chamber, of modifying an electromagnetic field generated by a set of leads terminating, either within the chamber itself or in the immediate vicinity thereof, at the structure forming the chamber, these leads forming part of a circuit connected to an indicator designed to register a movement of the mobile body.

The electric field set up within the chamber may be generated between one or more terminals which are conductively bridged or capacitively coupled by the interposition of the mobile body therebetween. Alternatively, I may use a set of inductances generating several flux paths whose reluctance is modified by the presence or absence of the magnetically permeable mobile body in these paths. The chamber confining the mobile body could be a sealed space or the interior of a basket or cage, of spherical shape or uniaxial (e.g. cylindrical or ellipsoidal) configuration, depending upon the type of mobility of which the chamber-forming structure is capable. In keeping with this type of mobility, the displaceable body confined in that chamber may also be spherical, cylindrical or generally barrel-shaped. It is also possible to constitute this body as a spontaneously deformable element of indefinite shape, such as a blob of mercury.

The invention will be described hereinafter in greater detail with reference to the accompanying drawing in which:

FIG. 2 is a circuit diagram showing the electrical connections of the detector of FIG. 1;

FIG. 3 is a circuit diagram similar to FIG. 2, representing a modification;

Figure 1:
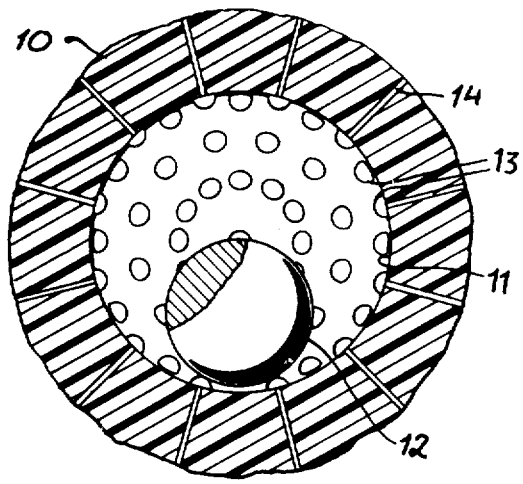
FIG. 1 is a cross-sectional view of the physical constituents of a motion detector embodying my invention.

In FIG. 1 I have shown part of a solid structure 10 whose outer configuration is immaterial for purposes of the present disclosure but which is formed, by any conventional technique such as the joinder of 2 separately molded halves, with a completely closed spherical cavity 11 surrounding a spherical metallic body 12 of substantially smaller diameter. The peripheral wall of cavity 11 is studded with a multiplicity of contacts 13 that form the inner terminals of a set of leads 14 and are disposed in a regular array which has been partly illustrated, in developed form, in FIG. 2.

These contacts, projecting inwardly to the center of the sphere, are divided into three groups 13a, 13b, 13c, respectively identified by the symbols 0, + and −. All the contacts of group 13a are connected in parallel to a common conductor 14a, other conductors 14b and 14c being similarly connected to terminals 13b and 13c, respectively.

A monitoring circuit, illustrated in FIG. 2, comprises a transistor 15 (here of the NPN type) having its base connected to bus bar 14a, its emitter being tied to bus bar 14b by way of a biasing battery 16 whereas its collector is joined to bus bar 14c through a source of operating voltage, here shown as a battery 17, in series with the primary winding of a coupling transformer 18 whose secondary works into an indicator 19. This indicator may be of the visual or audible type and/or may include a recorder for noting the time of occurrence of an alarm signal on a tape or other storage medium. When the system shown in FIGS. 1 and 2 is at rest, ball 12 invariably is supported by three of the contacts 13 which are so arranged that the ball, in any stable position, must engage one contact from each group, i.e. a contact 13a, a contact 13b and a contact 13c. This completes the operating circuit of transistor 15 so that a steady current flows through the primary of transformer 18 which, however, will not generate any output capable of actuating the indicator 19. If, however, the structure 10 is displaced, the highly mobile ball 12 will at least temporarily leave its previous seat so as to interrupt the energization of transistor 15 before reclosing the operating circuit thereof upon coming to rest on the same or a different set of contacts 13a, 13b, 13c. This momentary interruption of the primary current flow in transformer 18 gives rise to a voltage pulse in the transformer secondary which is registered as a disturbance signal by the indicator 19.

In FIG. 3 I have shown part of a modified array of contacts 13a, 13b, 13c, 13b', 13c', 13b'', 13c'' therein again, as in FIG. 2, no two contacts of the same group occupy adjacent positions so that the ball 12 of FIG. 1 must invariably come to rest on a triad 13a, 13b, (or 13b', 13b''), 13c (or 13c', 13c'') to close an associated monitoring circuit. It may be assumed that the contact 13a shown in FIG. 3 is disposed at the pole of a hemispherical half of chamber 11 (FIG. 1) and that the six other numbered contacts 13b, 13c etc. are equispaced along a latitudinal circle of that hemisphere, with the next latitudinal (or equatorial) circle consisting of twelve equispaced contacts illustrated only in part.

The monitoring circuit of FIG. 3 comprises a multiplicity of monostable multivibrators or monoflops generally designated 20, six such monoflops 21–26 being illustrated to correspond to the six possible positions of ball 12 on the numbered contacts 13a, 13b, 13c, 13b', 13c', 13b'', 13c''. These monoflops are controlled by three transistors 15, 15', 15'' having their bases connected in parallel to contact 13a representing the only numbered member of the first group. The emitters of these transistors are individually connected, by way of respective biasing batteries 16, 16', 16'', to the several contacts 13b, 13b', 13b'' of the second group, while their collectors, here grounded, are returned to the contacts 13c, 13c', 13c'' of the third group via pairs of parallel resistors 31–36 and respective operating batteries 17, 17', 17''. The junctions of resistors 31–36 with respective contacts of the third group are individually connected to the setting inputs of the associated monoflops 21–26 which are normally in their reset state. The outputs of these monoflops, and of similar monoflops (not shown) associated with other transistors likewise not illustrated, extend to an indicator 19 adapted to register individually a signal from any of these monoflops.

Let us assume that the ball 12 of FIG. 1 rests on the three contacts 13a, 13b, 13c' associated with transistor 15 and output resistor 32 thereof. The potential present at the junction of this resistor with contact 13c' in the conductive state of transistor 15 has no immediate effect upon the associated monoflop 22 which is assumed to have returned to its reset condition shortly after the ball 12 had engaged the contacts referred to.

When the ball leaves its seat and thereafter reverts to it, the temporary deenergization of transistor 15 gives rise to a trigger pulse in the input of monoflop 22 whose output thereupon actuates the indicator 19. If the ball had landed on, say, the contact 13c'' also juxtaposed with contacts 13a and 13b, a circuit would have been closed through transistor 15 by way of resistor 31 with resulting operation of monoflop 21. Similarly, one of the other monoflops 20 would have responded to the energization of transistor 15' or 15'' in one of the four remaining ball positions possible with the seven numbered contacts shown in FIG. 3. This is, of course, equally true of the nonillustrated transistors and monoflops assigned to the remaining triads of the contact array.

It will thus be apparent that the indicator 19 of FIG. 3 will not only register a change in position but also identify the set of contacts subsequently engaged by the ball 12. Thus, the peripheral surface of chamber 11 (FIG. 1) may be subdivided into, say, 48 sections each having an individual monoflop assigned thereto.

Figure 4:
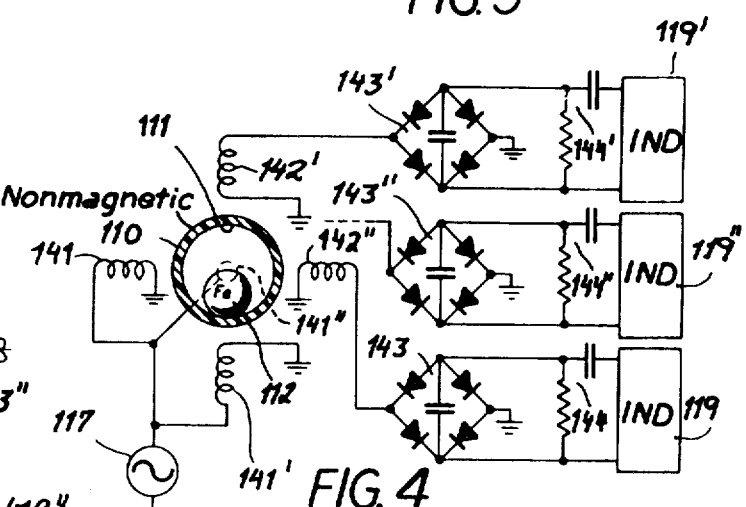
FIG. 4 is a diagrammatic view of a further motion detector embodying my invention.

In FIG. 4 I have shown a spherical structure 110 of nonmagnetic material enclosing a ball 112 of iron or other magnetically permeable material freely movable therein. A source 117 of alternating current constantly energizes a set of three orthogonally disposed transmitting coils 141, 141', 141''. A corresponding triad of receiving coils 142, 142' (the third one being not visible) are disposed in axial alignment with the respective transmitting coils 141, 141', 141'' and work into respective full-wave rectifiers 143, 143', 143'' whose output diagonals are connected via associated differentiation circuits 144, 144', 144'' across corresponding indicators 119, 119', 119''.

When the electromagnetic field linking, say, the coils 141 and 142 is undisturbed, the induced alternating current in pickup coil 142 generates a steady direct current in the output of rectifier 143 which does not stimulate the associated indicator 119 to register a signal. If, however, the ball 112 changes its position, the magnitude of the flux passing from coil 141 to coil 142 is altered so that differentiation circuit 144 triggers the indicator 119 to register a move. Since the three flux paths from coils 141, 141' and 141'' intersect at the center of the spherical chamber 111 and the ball 112 extends at least to the vicinity of that center, any displacement of that ball will effect the magnitude of the alternating current induced in each of the three receiving coils, yet the change in that magnitude will be relatively small if the ball moves generally in the direction of the coil axis. Thus, a comparison of the amplitudes of the three signals concurrently registered by indicators 119, 119', 119'' upon each displacement enables a determination of at least the general direction of such displacement.

Figure 5:
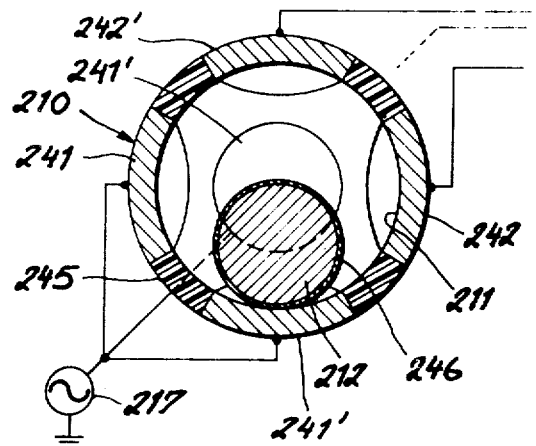
FIGS. 5–8 are views generally similar to FIG. 4 but illustrating additional modifications, FIG. 7 including a sectional view taken on the line VII—VII of FIG. 6.

In FIG. 5 I have illustrated a hollow sphere 210, generally similar to the sphere 110 of FIG. 4, subdivided into three pairs of conductive segments, i.e. three transmitting segments 241, 241', 241'' centered on three orthogonally related axes and three confronting receiving segments centered on the same axes, only the segments 242 and 242' of the receiving group being visible in the drawing. These conductive segments are separated by insulating spacers 245. The three transmitting segments 241, 241', 241'' are connected in parallel to a source 217 of high-frequency alternating current whereas the three receiving segments are individually connected to respective indicators by way of rectifiers and differentiation circuits such as those shown in FIG. 4.

A metallic ball 212 with a dielectric coating 246 modifies, by its position, the effective capacitance of any two confronting segments such as the pair 241, 242. Thus, any displacement of the ball within its chamber 211 gives rise to characteristic changes in the outputs of the three receiving segments which can again be evaluated to determine at least the general direction of such displacement.

The ball 212 of FIG. 5 could also be made of a nonconductive material of high dielectric constant.

Figure 6:
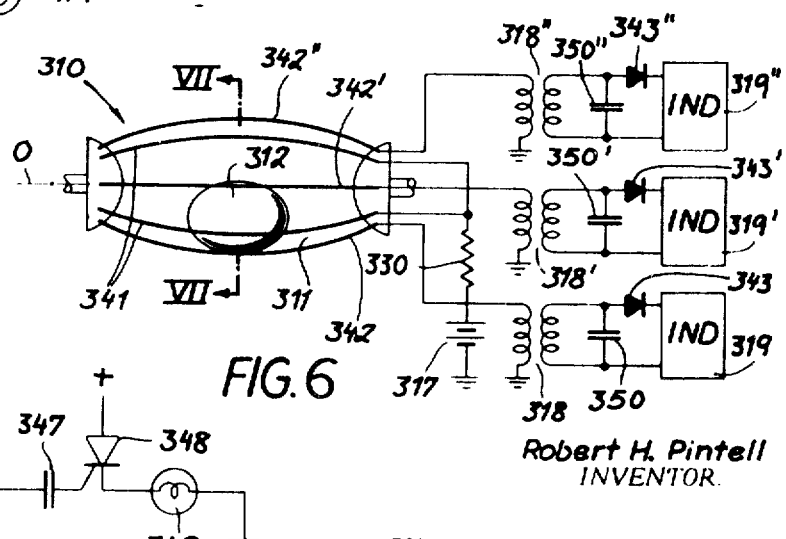

In FIG. 6 there is shown a somewhat simplified system wherein a cage 312, forming a chamber 311 about a mobile body 312, is rotatable only about a single axis O. The bars of cage 310 are conductors divided into a transmitting group 431, all connected in parallel to a source 317 of direct current by way of a resistor 330, and a receiving group consisting of individual conductors 342, 342', 342'' etc., the conductors of the two groups being alternately interleaved. Each receiving conductor 342, 342', 342'' is connected to the primary of a respective transformer 318, 318', 318'' working into an associated indicator 319, 319', 319''.

Mobile body 312 is shown to be generally ellipsoidal, similar to a football, and consists of conductive material so as to bridge the two cage bars on which it must rest in any stable position, this pair of bars necessarily including one conductor 341 and one of the individually identified receiving conductors 342 etc. Upon any motion of cage 310 about its axis O, therefore, one of the indicators 319 etc. picks up a signal whenever the body 312 momentarily breaks contact with one of its supporting bars and/or when that body comes to rest on such a pair of bars, the identity of the corresponding receiving bar (and therefore the angular position of cage 310) being determinable from the responding indicator. If desired, the indicator inputs may be provided with diodes 343, 343', 343'' so oriented as to suppress one of these signals whereby only the making or only the breaking of contact is registered.

Figure 7:
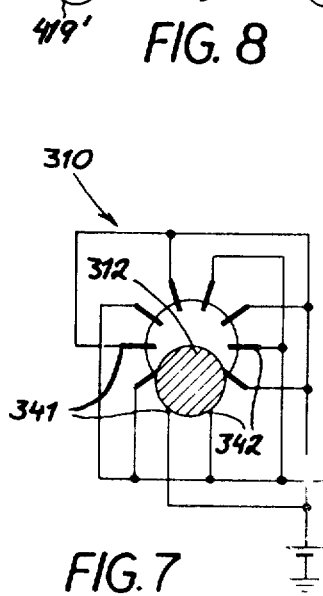

FIG. 7 shows the same cage 310 included in an even simpler circuit arrangement wherein all the receiving bars 342, alternating with transmitting bars 341, are connected in parallel via a condenser 347 to the gate electrode of a solid-state-controlled rectifier 348 which, on becoming conductive, energizes an alarm lamp 349 remains operated for an indefinite period after any rotary motion of cage 310 which, however briefly, dislodges the mobile body 312 from its seat so as to transmit a gate pulse to controlled rectifier 348 upon subsequent reclosure of the circuit.

It will be apparent that the indicators of the preceding embodiments may be similarly modified to provide a permanent signal in response to any displacement of the chamber-forming structure. In the system of FIG. 6, for example, the several indicators 319, 319', 319'' could be used to indicate whether such a displacement was a partial rotation in one direction, a partial rotation in the other direction or a jolt followed by a return of the body 312 to its original seat.

Figure 8:
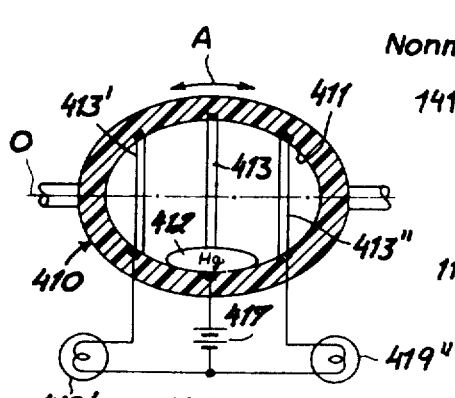

FIG. 8 illustrates the adaptation of my invention to a structure 410 normally rotating about an axis O but capable of deviating from its normal position by tilting about a transverse axis as indicated by an arrow A. The chamber 411 formed in that structure is partly occupied by a blob of mercury 412 normally resting in a median position on a conductive strip 413 of annular shape, connected to a battery 417 and centered on spin axis O, without touching either of two similar strips 413', 413'' flanking the strip 413. If, however, the structure 410 tilts to either side, blob 412 transmits the potential of battery 417 to either of two lamps 419', 419'' representative of any of the alarm indicators previously described. Thus, the system of FIG. 8 may form part of an automatic pilot, with the structure 410 acting as a stabilizer which opposes any swing in the plane of arrow A by virtue of its spin about axis O.

In the closed-chamber systems illustrated in FIGS. 1, 4, 5 and 8, it is possible to extend the service life of the contacts and/or the mobile body by evacuating the chamber or filling it with an inert gas so as to prevent the oxidation of the metallic surfaces therein.

In some instances it may be desirable to make the system nonresponsive to very short deviations from a normal position, e.g. as a result of minor shocks due to the motion of a traveling vehicle carrying the monitoring device. For this purpose, the system may be equipped with threshold means measuring the duration of an output signal and preventing the transmission of such signal to an indicator unless its length exceeds a predetermined period. This has been illustrated, by way of example, in FIG. 6 where the secondaries of transformers 318, 318', 318'' are shown bridged by respective shunting condensers 350, 350', 350'' which charge up in response to a spike due to the breaking of the primary circuit and which are promptly recharged by a spike of opposite polarity, upon an immediately following reclosure of that circuit, so that their potential will fail in such cases to reach the minimum value necessary to trigger the suitably biased indicators 319, 319', 319''.

I claim:

1. A motion detector comprising a round mobile body capable of modifying an electromagnetic field, a structure forming a confining chamber around said body with a continuously curved inner peripheral surface in rolling contact therewith, circuit means including a plurality of leads terminating adjacent said structure for setting up an electromagnetic field adapted to be disturbed by a rolling movement of said body on said inner peripheral surface from an initial position, and indicator means connected to said circuit means for registering such movement.

2. A motion detector as defined in claim 1 wherein said chamber is spherical.

3. A motion detector as defined in claim 1 wherein said structure is nonmagnetic and said circuit means includes a plurality of mutually orthogonal induction coils connected to said leads adjacent said chamber, said body being magnetically permeable.

4. A motion detector as defined in claim 1 wherein said circuit means includes capacitive elements connected to said leads and disposed close to said chamber.

5. A motion detector as defined in claim 1 wherein said chamber is airtight and substantially free of oxidizing gases.